(12) United States Patent
Sivanandan et al.

(10) Patent No.: US 10,170,792 B2
(45) Date of Patent: Jan. 1, 2019

(54) POLYALKOXYSILOXANE CATHOLYTES FOR HIGH VOLTAGE LITHIUM BATTERIES

(71) Applicant: Seeo, Inc, Hayward, CA (US)

(72) Inventors: Kulandaivelu Sivanandan, Fremont, CA (US); Hany Basam Eitouni, Oakland, CA (US)

(73) Assignee: Seeo, Inc., Hayward, CA (US)

( * ) Notice: Subject to any disclaimer, the term of this patent is extended or adjusted under 35 U.S.C. 154(b) by 294 days.

(21) Appl. No.: 15/207,481

(22) Filed: Jul. 11, 2016

(65) Prior Publication Data

US 2017/0352918 A1    Dec. 7, 2017

(51) Int. Cl.
| | |
|---|---|
| *H01M 10/0565* | (2010.01) |
| *H01M 10/0525* | (2010.01) |
| *H01M 4/62* | (2006.01) |
| *H01M 4/02* | (2006.01) |

(52) U.S. Cl.
CPC ......... *H01M 10/0565* (2013.01); *H01M 4/62* (2013.01); *H01M 10/0525* (2013.01); *H01M 2004/028* (2013.01); *H01M 2300/0082* (2013.01)

(58) Field of Classification Search
CPC .............................................. H01M 10/0565
See application file for complete search history.

(56) References Cited

U.S. PATENT DOCUMENTS

| | | |
|---|---|---|
| 5,548,055 A | 8/1996 | Narang et al. |
| 5,606,077 A | 2/1997 | Lersch et al. |
| 6,589,383 B1 | 7/2003 | Takaoka et al. |
| 8,268,197 B2 | 9/2012 | Singh et al. |
| 8,563,168 B2 | 10/2013 | Balsara et al. |
| 8,889,301 B2 | 11/2014 | Balsara et al. |
| 9,136,562 B2 | 9/2015 | Singh et al. |
| 2006/0083992 A1 | 4/2006 | Nakanishi et al. |
| 2007/0059607 A1 | 3/2007 | Nakanishi et al. |
| 2010/0239918 A1 | 9/2010 | Pratt et al. |
| 2011/0206994 A1 | 8/2011 | Balsara et al. |
| 2011/0281173 A1 | 11/2011 | Singh et al. |
| 2012/0029099 A1 | 2/2012 | Hsieh et al. |
| 2012/0153219 A1 | 6/2012 | Zhang et al. |
| 2013/0040207 A1 | 2/2013 | Gupta et al. |
| 2014/0322614 A1 | 10/2014 | Eitouni et al. |
| 2016/0028114 A1 | 1/2016 | Pratt et al. |

FOREIGN PATENT DOCUMENTS

WO    2014012679 A1    1/2014

OTHER PUBLICATIONS

International Search Report for PCT/US2017/024186.
(Continued)

*Primary Examiner* — Stephan J Essex
(74) *Attorney, Agent, or Firm* — R'Sue Popowich Caron

(57) ABSTRACT

Synthesis and electrochemical properties of a new class of low-glass-transition-temperature electrochemical cell polymers based on polyalkoxysiloxanes is described. Unlike ethyleneoxide (EO)-based polymers, these materials are oxidatively stable above 4.2 V, the operating voltage of high energy cells that use cathode materials such as nickel cobalt aluminum oxide (NCA) and nickel cobalt manganese oxide (NCM). Use of these electrochemical cell polymers as catholyte alternatives to PEO in high voltage cells is described.

11 Claims, 3 Drawing Sheets

(56) References Cited

OTHER PUBLICATIONS

Substance Record for SID 240694679. Feb. 13, 2015. [retrieved on Feb. 13, 2015]. Retrieved from the Internet . . . .
(Zhou, GB et al.) "Solvent-free cation-conducting polysiloxane electrolytes with pendant oligo (oxyethylene) and sulfonate groups." Macromolecules. 1993. vol. 26. No. 9; abstract; p. 2206.
Abe, "Oligo- and polysilo xanes," Prog. Polym. Sci. xx (2004) xxx-xxx.
International Search Report for PCT/US16/36265.
Jaumann, "Hyperbranched Polyalkoxysiloxanes Synthesis, Characterization and Applications," Dissertation, Aachen University, Sep. 4, 2008.

POLYALKOXYSILOXANE CATHOLYTES FOR HIGH VOLTAGE LITHIUM BATTERIES

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (nickel cobalt aluminum oxide) and NCM (nickel cobalt manganese oxide) in order to exploit their potentially high energy densities (as high as 300-500 Wh/kg), their good rate capabilities and their long-term stability. Cells made with such materials operate at higher voltages (e.g., 4.2-4.35V) than cells with more conventional LFP (lithium iron phosphate) cathodes (3.6-3.8V). Electrolytes that have been stable at the lower voltages of conventional cells may have difficulty operating at these new higher voltages, especially in the cathode. Degradation, in the form of oxidation, may lead to capacity fade early in the life of a cell.

Thus, there is a need to develop electrolytes that are especially well-suited to operate in the high voltage conditions of next generation cathode materials.

SUMMARY

In one embodiment of the invention, a polyalkoxysiloxane polymer is disclosed. The polyalkoxysiloxane polymer has the following structure:

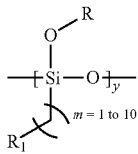

wherein R is selected from the group consisting of alkanes, cyclic alkanes, alkenes, cyclic alkenes, aromatics, and substituted aromatics; $R_1$ is an aprotic polar group; and y ranges from 1 to 100.

In one arrangement, R is selected from the group consisting of methyl, ethyl, propyl, tert-butyl, cyclohexyl, vinyl, allyl, phenyl, substituted phenyl, and napthyl groups. In another arrangement, R is selected from the group consisting of radical initiators, photoactive groups, electroactive groups, and biologically active groups.

In one arrangement, $R_1$ is selected from the group consisting of —CN, —$SO_3^-M^+$, —$PO_4^-M^+$, $CO_2^-M^+$, —$N(R)_3^+X^-$, cyclic carbonates, linear carbonates, linear phosphonates, linear phosphates, sulfonates, and cyclic carbomates; $X^-$ is selected from the group consisting of TFSI, $BF_4^-$, $PF_6^-$, BOB$^-$, FAP$^-$, BETI$^-$, and TCB$^-$; and M+ is an alkali or alkaline metal ion. In one arrangement, M+ is a lithium ion.

The polymer may have a linear, branched, hyperbranched, or crosslinked structure, or a combination thereof. In one arrangement, the polymer also includes an electrolyte salt.

In another embodiment of the invention, a polyalkoxysiloxane polymer is an ordered nanostructure comprising a matrix of first domains formed by an association of first polymers and second domains formed by an association of second polymers. The first polymers and the second polymers form block copolymers wherein the first polymers form first blocks and the second polymers form second blocks. The first blocks include one or more polyalkoxysiloxane polymers that have the following structure:

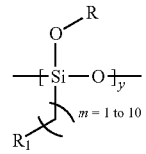

wherein R is selected from the group consisting of alkanes, cyclic alkanes, alkenes, cyclic alkenes, aromatics, and substituted aromatics; $R_1$ is an aprotic polar group; and y ranges from 1 to 100. More specific choices for R and $R_1$ are listed above.

In one arrangement, the second blocks include one or more polymers selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, and copolymers that contain styrene, methacrylate, or vinylpyridine. In one arrangement, the second blocks comprise polystyrene.

In one arrangement, $R_1$ is selected from the group consisting of —CN, —$SO_3^-M^+$, —$PO_4^-M^+$, $CO_2^-M^+$, —$N(R)_3^+X^-$, cyclic carbonates, linear carbonates, linear phosphonates, linear phosphates, sulfonates, and cyclic carbomates; $X^-$ is selected from the group consisting of TFSI, $BF_4^-$, $PF_6^-$, BOB$^-$, FAP$^-$, BETI$^-$, and TCB$^-$; and M+ is an alkali or alkaline metal ion. In one arrangement, M+ is a lithium ion.

In another embodiment of the invention, an electrochemical cell is disclosed. The electrochemical cell has an anode configured to absorb and release lithium ions; a cathode comprising cathode active material particles, an electronically-conductive additive, a first catholyte, and an optional binder material; a current collector adjacent to an outside surface of the cathode; and a separator region between the anode and the cathode, the separator region comprising a separator electrolyte configured to facilitate movement of lithium ions back and forth between the anode and the cathode. The first catholyte includes a first polyalkoxysiloxane polymer that has the following structure:

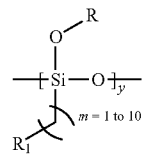

wherein R is selected from the group consisting of alkanes, cyclic alkanes, alkenes, cyclic alkenes, aromatics, and substituted aromatics; $R_1$ is an aprotic polar group; and y ranges from 1 to 100. More specific choices for R and $R_1$ are listed above.

In one arrangement, the first catholyte and the separator electrolyte are the same.

The electrochemical cell may also include an overlayer between the cathode and the separator region. The overlayer may include a second catholyte that also includes a second polyalkoxysiloxane polymer that has the following structure:

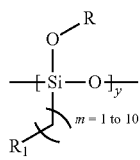

wherein R is selected from the group consisting of alkanes, cyclic alkanes, alkenes, cyclic alkenes, aromatics, and substituted aromatics; $R_1$ is an aprotic polar group; and y ranges from 1 to 100. More specific choices for R and $R_1$ are listed above. In one arrangement, the first catholyte and the second catholyte are the same.

In one arrangement, the first catholyte includes an ordered nanostructure comprising a matrix of first domains defined by association of the first polyalkoxysiloxane polymers and an electrolyte salt and second domains defined by association of second polymers. The first polyalkoxysiloxane polymers and the second polymers form block copolymers wherein the first polyalkoxysiloxane polymers form first blocks and the second polymers form second blocks.

In one arrangement, the second block comprises one or more polymers selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, fluorocarbons, such as polyvinylidene fluoride, and copolymers that contain styrene, methacrylate, or vinylpyridine.

The anode may be a material selected from the group consisting of lithium metal, lithium alloy, graphite and silicon. The cathode active material particles may be one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel. The electronically-conductive additive may be selected from the group consisting of carbon black, graphite, vapor-grown carbon fiber, graphene, carbon nanotubes, and combinations thereof.

The binder material may be any of polyvinylidene difluoride, poly(vinylidene fluoride-co-hexafluoropropylene, polyacrylonitrile, polyacrylic acid, polyethylene oxide, carboxymethyl cellulose, styrene-butadiene rubber, and combinations thereof.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
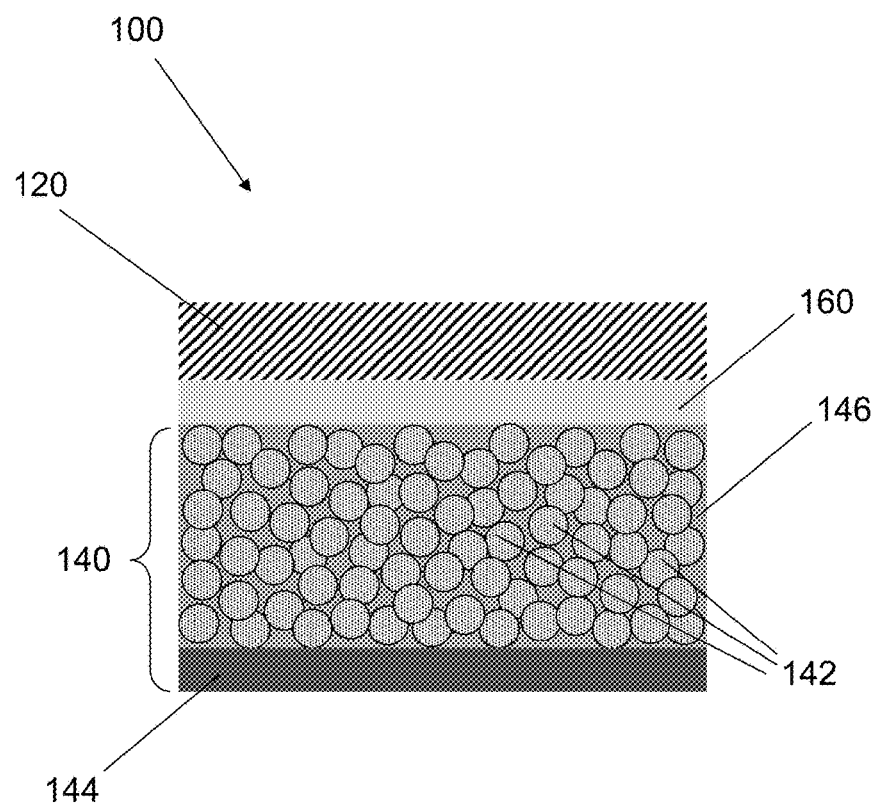
FIG. 1 is a schematic illustration of one configuration of a lithium battery cell that contains a catholyte, according to an embodiment of the invention.

The preferred embodiments are illustrated in the context of organosilicon polymers that can be combined with salts (e.g., lithium or other alkali metal salts) to create ionically conductive materials for use in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein. All ranges described herein are meant to include all ranges subsumed therein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte.

In various embodiment of the invention, synthesis methods and electrochemical properties for a number of low-glass-transition-temperature polyalkoxysiloxane (PAOSN) polymers with polar substituents are described. These materials are oxidatively stable above 4.2 V, making them ideal for use as electrolytes and/or catholytes in next-generation of high energy cells that use cathode materials such as nickel cobalt aluminum oxide (NCA) and nickel cobalt manganese oxide (NCM).

Polyalkoxysiloxane (PAOSN):

The general structure of PAOSN is shown below:

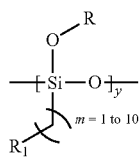

In one embodiment of the invention, $R_1$ is an aprotic polar group.

In one arrangement, $R_1$ is an aprotic non-ionic polar group. Examples of such groups include nitriles, cyclic carbonates, linear carbonates, linear phosphonates, linear phosphates, sulfonates, cyclic carbamates as shown in the structures below.

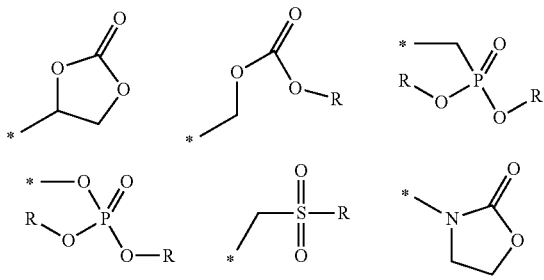

In another arrangement, $R_1$ is an aprotic ionic polar group that includes but is not limited to $—SO_2O^-M^+$, $—P(O)O_2^- M_2^+$, $—CO_2^-M^+$, and $—N(R)_3^+X^-$. The metal cation, $M^+$, may be any alkali or alkaline metal ion, such as $Li^+$, $Na^+$, $K^+$, $Cs^+$, $Mg^{2+}$, or $Ca^{2+}$; and $X^-$ may be $TFSI^-$, $BF_4^-$, $PF_6^-$, $BOB^-$, $FAP^-$, $BETI^-$, or $TCB^-$ (tetracyanoborate). In one arrangement, the number of alkoxysiloxane repeat units, y, can range from 1 to 100.

In one arrangement, R is either a saturated alkyl group such as methyl, ethyl, propyl, t-butyl, cyclohexyl or an unsaturated alkyl group such as vinyl, allyl or an aromatic group such as phenyl, substituted phenyl, or napthyl. In another arrangement, R may be a living radial polymerization initiator such as nitroxide, peroxide, or chloroalkyl groups that can be used to generate comb or brush-type polymers, hyper-branched polymers or cross-linked polymers, gels and nanoparticles.

In one arrangement, R is a photo-active group such as pyrene, anthracene, or dansyl. In another arrangement, R is an electroactive group such as ferrocene or cobaltocene. In yet another arrangement, R is a biologically active group such as aminoacid, peptide, or protein.

In some arrangements, R is an aprotic non-ionic polar group or an aprotic ionic as described above in reference to $R_1$. In such arrangements, R may be the same as $R_1$ or different from $R_1$.

PAOSN properties such as solubility, polarity and conductivity can be modulated by changing the graft length (i.e., m value) in $R_1$. In one arrangement, m ranges from 1 to 10.

PAOSN may have any of a variety of structures such as linear, branched, hyper-branched or crosslinked structures. The method of synthesis may determine the structure.

Copolymers of PAOSN with two or more varying R and/or $R_1$ groups is also possible. Such copolymers may be random copolymers, alternating copolymers, or block copolymers. When R is a radical initiator, such copolymers may be graft copolymers.

PAOSNs can also form random copolymers, alternating copolymers, block copolymers or graft copolymers (when R is a radical initiator) with other polymers. Examples of such other polymers include, but are not limited to, non-ion conducting polymers such as polystyrene (PS), polybutadiene (PBD), polyethylene (PE), polyphenyleneoxide (PPE), and/or polyimide (PI), ion-conducting polymers such as polyethyleneoxide (PEO), polyphosphonate (PPN), polycarbonate (PC), and/or polyacrylonitrile (PAN).

In one arrangement, one or more polyalkoxysiloxane polymers form block copolymers with second polymers, and together they form an ordered nanostructure. The ordered nanostructure contains a matrix of first domains made up of the polyalkoxysiloxane polymer blocks and second domains made up of the second polymer blocks. The polyalkoxysiloxane blocks may also include an electrolyte salt. The second blocks may be any of the other polymers discussed above as forming copolymers with PAOSNs or any of those discussed below as possibilities for the structural phase in a solid polymer electrolyte.

In an exemplary embodiment, a nitrile-containing PAOSN is synthesized as shown below. To a suspension of (3-cyanopropyl)triethoxysilane 1 (10 g, 43.2 mmol) in distilled water (0.88 g, 48.8 mmol) and methanol (2.84 g, 86.1 mmol), a 37% solution of concentrated hydrochloric acid (0.085 g, 0.86 mmol) was added dropwise with vigorous stirring under $N_2$ purging. The reaction was allowed to proceed at room temperature for 2 hours and gradually the solution became clear and viscous. The polymer 2 precipitated when the reaction mixture was added to methanol. After isolating the polymer and drying it under high vacuum overnight, (PAOSN) polymer 2 was obtained as a clear viscous liquid with a yield of 4.37 g (60%). Note that this same approach can be used to synthesize polymers with functionalities, such as cyclic carbonates, phosphates, sulfates, and phosphonates.

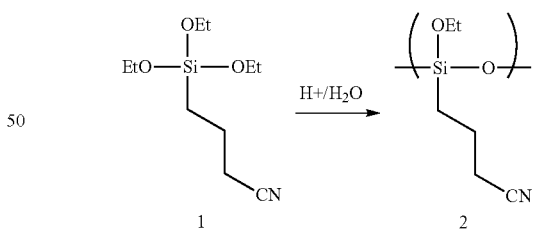

Conductivity of Polyalkoxysiloxane Materials:

Polyalkoxysiloxane materials (PAOSNs) mixed with LiTFSI or $LiBF_4$ were used as electrolytes in symmetric cells that had aluminum electrodes. Impedance spectroscopy was used to measure lithium ion conductivities in the electrolytes at 80° C. For example, the lithium ion conductivity of PAOSN 6 with 20 wt. % LiTFSI and LiBF4 is shown in Table I below. The data show that all PAOSNs have sufficient lithium ion conductivity at 80° C. to be useful in lithium battery cells.

TABLE I

| Polyalkoxysiloxane material | Structure | Electrolyte Salt (concentration) | Conductivity at 80° C. (S/cm) |
|---|---|---|---|
| PAOSN-4C-Nitrile | (OEt/Si—O) with CN branch | LiTFSI (20 wt %) | $1.60 \times 10^{-4}$ |
| PAOSN-4C-Nitrile | | LiBF$_4$ (20 wt %) | $1.19 \times 10^{-4}$ |

Stability of Polyalkoxysiloxane Materials:

Cyclic voltammetry was used to measure voltage stability of PAOSNs. The setup consisted of an aluminum working electrode and lithium reference and counter electrodes. Solutions of PAOSNs in propylene carbonate (10 wt. %) with LiBF$_4$ (10 wt. % with respect to PAOSN) was subjected to a voltage sweep from 1.38 V (open circuit voltage) to 5V at room temperature, and the current response was monitored. The onset of surging current at a particular voltage is considered to be the voltage at which PAOSN undergoes oxidation. As representative examples, two different polyalkoxysiloxane (PAOSN) materials (one in which R$_1$ was cyclic carbonate and one in which R$_1$ was nitrile) were studied, and they were found to be stable above 4.2V.

Polyalkoxysiloxane Polymer Catholytes:

Polyalkoxysiloxane polymer materials may be used as electrolytes when they are combined with appropriate electrolyte salts. There are no particular restrictions on the electrolyte salt that can be used in the polyalkoxysiloxane electrolytes. Any electrolyte salt that includes the ion identified as the most desirable charge carrier for the application can be used. It is especially useful to use electrolyte salts that have a large dissociation constant within the polymer electrolyte. When an electrolyte is used in the cathode, it can be referred to as a catholyte.

In various embodiments of the invention, for various cell electrochemistries, electrolytes are made by combining polyalkoxysiloxane polymer materials with salts that include the metal that is the basis of the cell. Possible electrochemistries include, but are not limited to, those based on Li, Na, K, Mg, Ca, Al, Ag, Ba, or Pb. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$.

Examples of appropriate salts for any electrolyte disclosed herein include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of alkali metals such as lithium, sodium, potassium and cesium, or silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, lithium alkyl fluorophosphates (LiFAP), lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, LiOTf, LiC(Tf)$_3$, lithium bis-(oxalato)borate (LiBOB), lithium difluoro(oxalato)borate (LiDFOB), lithium-bis (perfluoroethylsulfonyl) imide (LiBETI), lithium difluoro(oxalato)borate (LiDFOB), lithium tetracyanoborate (LiTCB), and mixtures thereof. In other arrangements, for other electrochemistries, electrolytes are made by combining the polymers with various kinds of non-lithium salts. For example, non-lithium salts such as salts of aluminum, sodium, and magnesium can be used with their corresponding metals. Specific examples of such salts include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$. Concentration of metal salts in the electrolytes disclosed herein range from 5 to 50 wt %, 5 to 30 wt %, 10 to 20 wt %, or any range subsumed therein.

In one embodiment of the invention, the polyalkoxysiloxane polymer electrolytes disclosed herein are used as catholytes in lithium battery cells. With reference to FIG. 1, a lithium battery cell 100 has an anode 120 that is configured to absorb and release lithium ions. The anode 120 may be a lithium or lithium alloy foil or it may be made of a material into which lithium ions can be absorbed such as graphite or silicon. The lithium battery cell 100 also has a cathode 140 that includes cathode active material particles 142, an electronically-conductive additive (not shown), a current collector 144, a catholyte 146, and an optional binder (not shown). The catholyte 146 may be any of the polyalkoxysiloxane polymer electrolytes disclosed here. There is a separator region 160 between the anode 120 and the cathode 140. The separator region 160 contains an electrolyte that facilitates movement of lithium ions (or another metal ions that form the basis of the cell) back and forth between the anode 120 and the cathode 140 as the cell 100 cycles. The separator region 160 may include any electrolyte that is suitable for such use in a lithium battery cell. In one arrangement, the separator region 160 contains a porous plastic material that is soaked with a liquid electrolyte. In another arrangement, the separator region 160 contains a viscous liquid or gel electrolyte. In another arrangement, the separator region 160 contains a solid polymer electrolyte.

A solid polymer electrolyte for use in separator region 160 can be any such electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more polyalkoxysiloxanes, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide) (pxe), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state. Further information about such block copolymer electrolytes can be found in U.S. Pat. No. 9,136,562, issued Sep. 15, 2015, U.S. Pat. No. 8,889,301, issued Nov. 18, 2014, U.S. Pat. No. 8,563,168, issued Oct. 22, 2013, and U.S. Pat. No. 8,268,197, issued Sep. 18, 2012, all of which are included by reference herein.

Figure 2:
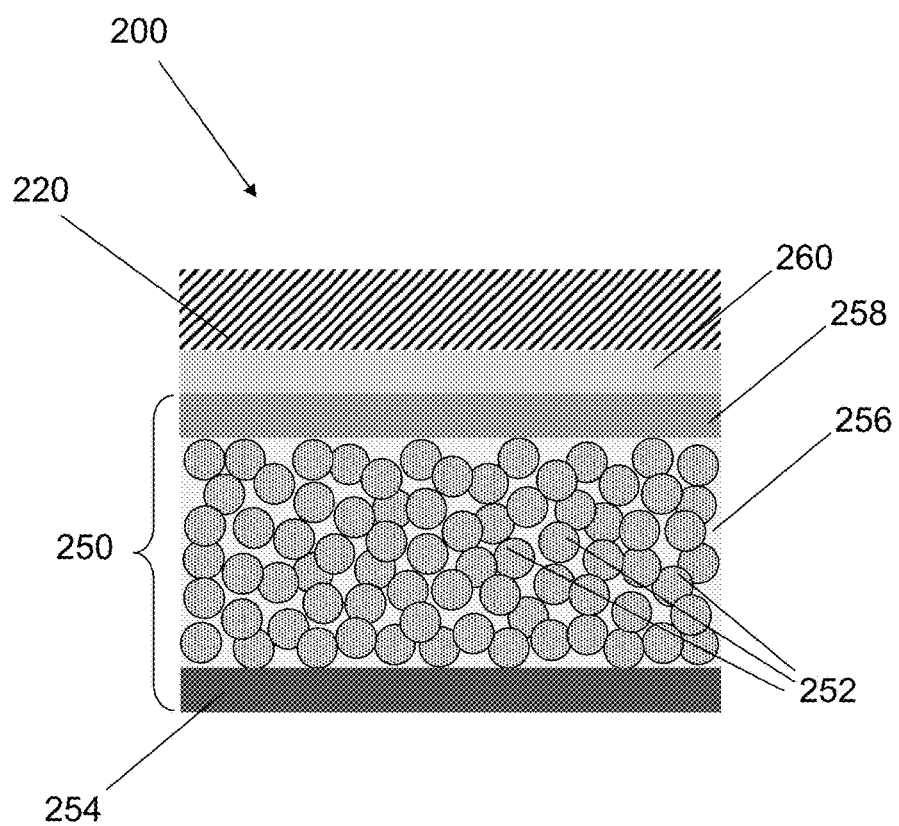
FIG. 2 is a schematic illustration of another configuration of a lithium battery cell that contains a catholyte and a cathode overlayer, according to an embodiment of the invention.

In another embodiment of the invention, a battery cell with a second configuration is described. With reference to FIG. 2, a lithium battery cell 200 has an anode 220 that is configured to absorb and release lithium ions. The anode 220 may be a lithium or lithium alloy foil or it may be made of a material into which lithium ions can be absorbed such as graphite or silicon. The lithium battery cell 200 also has a cathode 250 that includes cathode active material particles 252, an electronically-conductive additive (not shown), a current collector 254, a catholyte 256, an optional binder (not shown), and an overcoat layer 258. Both the electrolyte in the overcoat layer 258 and the catholyte 256 contain any of the polyalkoxysiloxane polymer electrolytes disclosed here. In one arrangement, the electrolyte in the overcoat layer 258 and the catholyte 256 are the same. In another arrangement, the electrolyte in the overcoat layer 258 and the catholyte 256 are different. There is a separator region 260 between the anode 220 and the cathode 250. The separator region 260 contains an electrolyte that facilitates movement of lithium ions back and forth between the anode 220 and the cathode 250 as the cell 200 cycles. The separator region may include any electrolyte that is suitable for such use in a lithium battery cell, as described above.

Figure 3:
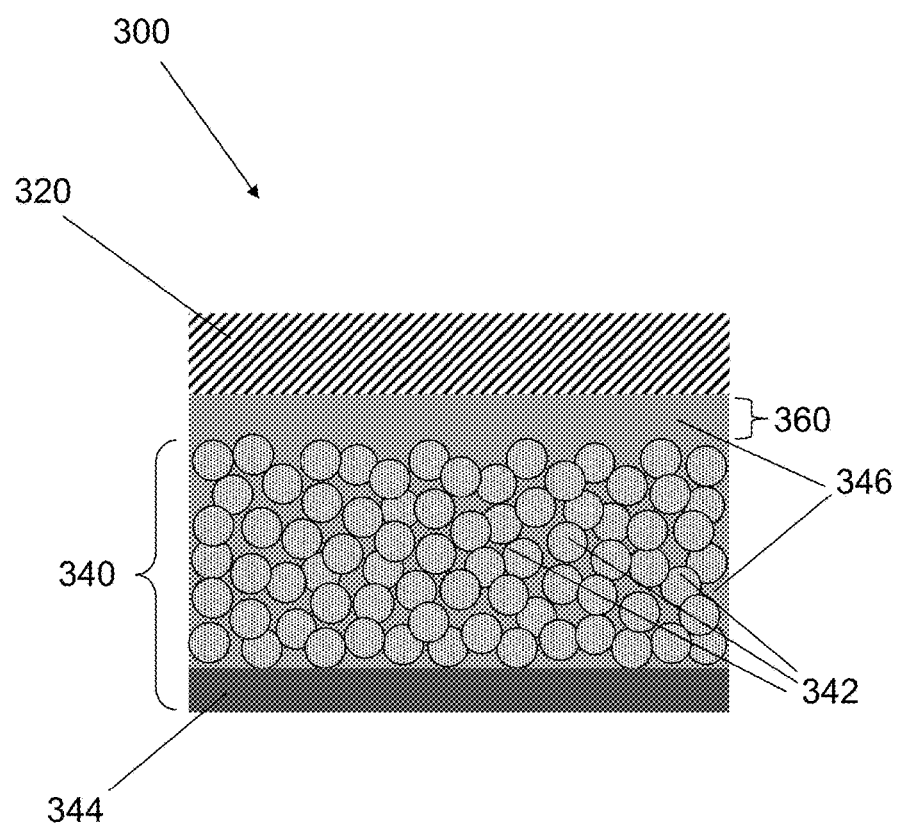
FIG. 3 is a schematic illustration of another configuration of a lithium battery cell that contains a catholyte, according to an embodiment of the invention.

In another embodiment of the invention, a battery cell with a third configuration is described. With reference to FIG. 3, a lithium battery cell 300 has an anode 320 that is configured to absorb and release lithium ions. The anode 320 may be a lithium or lithium alloy foil or it may be made of a material into which lithium ions can be absorbed such as graphite or silicon. The lithium battery cell 300 also has a cathode 340 that includes cathode active material particles 342, an electronically-conductive additive (not shown), a current collector 344, a catholyte 346, and an optional binder (not shown). The catholyte 346 may be any of the polyalkoxysiloxane polymer electrolytes disclosed here. There is a separator region 360 between the anode 320 and the cathode 340. The catholyte 346 extends into the separator region 360 and facilitates movement of lithium ions back and forth between the anode 320 and the cathode 340 as the cell 300 cycles.

With respect to the embodiments discussed in FIGS. 1, 2, and 3, suitable cathode active materials include, but are not limited to, LFP (lithium iron phosphate), LMP (lithium metal phosphate in which the metal can be Mn, Co, or Ni), NCA, NCM, high energy NCM, lithium manganese spinel, and combinations thereof. The cathode active material particles may be one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP (poly(vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A polymer composition, comprising:
   an ordered nanostructure comprising a matrix of:
   first domains formed by an association of first polymers; and
   second domains formed by an association of second polymers;
   wherein the first polymers and the second polymers form block copolymers, wherein the first polymers form first blocks and the second polymers form second blocks; and
   wherein the first blocks comprise one or more polyalkoxysiloxane polymers comprising:

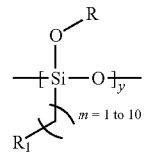

wherein R is selected from the group consisting of alkanes, cyclic alkanes, alkenes, cyclic alkenes, aromatics, and substituted aromatics;
   $R_1$ is selected from the group consisting of —CN, —SO$_3^-$M$^+$, —PO$_4^-$M$^+$, CO$_2^-$M$^+$, —N(R)$_3^+$X$^-$, linear carbonates, linear phosphonates, linear phosphates, sulfonates, and cyclic carbamates;
   X$^-$ is selected from the group consisting of TFSI, BF$_4^-$, PF$_6^-$, BOB$^-$, FAP$^-$, BETI$^-$, and TCB$^-$;
   M+ is an alkali or alkaline metal ion; and
   v ranges from 1 to 100; and
   wherein the second blocks comprise polystyrene.

2. An electrochemical cell, comprising:
   an anode configured to absorb and release lithium ions;
   a cathode comprising cathode active material particles, an electronically-conductive additive, a first catholyte, and an optional binder material;
   a current collector adjacent to an outside surface of the cathode; and
   a separator region between the anode and the cathode, the separator region comprising a separator electrolyte configured to facilitate movement of lithium ions back and forth between the anode and the cathode;
   wherein the first catholyte comprises a first polyalkoxysiloxane polymer, comprising:

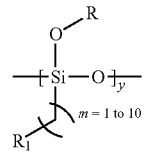

wherein R is selected from the group consisting of alkanes, cyclic alkanes, alkenes, cyclic alkenes, aromatics, and substituted aromatics;

R$_1$ is selected from the group consisting of —CN, —SO$_3^-$M$^+$, —PO$_4^-$M$^+$, CO$_2^-$M$^+$, —N(R)$_3^+$X$^-$, linear carbonates, linear phosphonates, linear phosphates, sulfonates, and cyclic carbamates;

X$^-$ is selected from the group consisting of TFSI, BF$_4^-$, PF$_6^-$, BOB$^-$, FAP$^-$ BETI$^-$, and TCB$^-$;

M+ is an alkali or alkaline metal ion; and y ranges from 1 to 100.

3. The electrochemical cell of claim 2 wherein the first catholyte and the separator electrolyte are the same.

4. The electrochemical cell of claim 2 further comprising an overlayer between the cathode and the separator region, the overlayer comprising a second catholyte, the second catholyte comprising a second polyalkoxysiloxane polymer comprising:

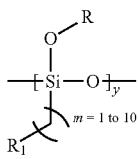

wherein R is selected from the group consisting of alkanes, cyclic alkanes, alkenes, cyclic alkenes, aromatics, and substituted aromatics;

R$_1$ is an aprotic polar group; and y ranges from 1 to 100.

5. The electrochemical cell of claim 4 wherein the first catholyte and the second catholyte are the same.

6. The electrochemical cell of claim 2 wherein the first catholyte further comprises:
an ordered nanostructure comprising a matrix of:
first domains defined by association of the first polyalkoxysiloxane polymers and an electrolyte salt; and
second domains defined by association of second polymers;
wherein the first polyalkoxysiloxane polymers and the second polymers form block copolymers, wherein the first polyalkoxysiloxane polymers form first blocks and the second polymers form second blocks.

7. The electrochemical cell of claim 6 wherein the second block comprises one or more polymers selected from the group consisting of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly (cyclohexyl methacrylate), poly(cyclohexyl vinyl ether), poly(t-butyl vinyl ether), polyethylene, poly(phenylene oxide), poly(2,6-dimethyl-1,4-phenylene oxide) (PXE), poly(phenylene sulfide), poly(phenylene sulfide sulfone), poly(phenylene sulfide ketone), poly(phenylene sulfide amide), polysulfone, polyvinylidene fluoride, and copolymers that contain styrene, methacrylate, or vinylpyridine.

8. The electrochemical cell of claim 2 wherein the anode comprises a material selected from the group consisting of lithium metal, lithium alloy, graphite and silicon.

9. The electrochemical cell of claim 2 wherein the cathode active material particles comprise one or more materials selected from the group consisting of lithium iron phosphate, nickel cobalt aluminum oxide, nickel cobalt manganese oxide, lithium manganese phosphate, lithium cobalt phosphate, lithium nickel phosphate, and lithium manganese spinel.

10. The electrochemical cell of claim 2 wherein the binder material is selected from the group consisting of polyvinylidene difluoride, poly(vinylidene fluoride-co-hexafluoropropylene, polyacrylonitrile, polyacrylic acid, polyethylene oxide, carboxymethyl cellulose, styrene-butadiene rubber, and combinations thereof.

11. An electrochemical cell, comprising:
an anode configured to absorb and release lithium ions;
a cathode comprising cathode active material particles, an electronically-conductive additive, a first catholyte, and an optional binder material;
a current collector adjacent to an outside surface of the cathode; and
a separator region between the anode and the cathode, the separator region comprising a separator electrolyte configured to facilitate movement of lithium ions back and forth between the anode and the cathode;
wherein the first catholyte comprises a first polyalkoxysiloxane polymer, comprising:

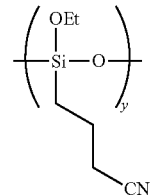

wherein y ranges from 1 to 100.

* * * * *